US009469776B2

United States Patent
Kelly et al.

(10) Patent No.: US 9,469,776 B2
(45) Date of Patent: Oct. 18, 2016

(54) FREEZE-THAW STABLE PAINT FORMULATION

(71) Applicant: Rohm and Haas Company, Philadelphia, PA (US)

(72) Inventors: David G. Kelly, Ambler, PA (US); Pu Luo, King Of Prussia, PA (US); Michael Rhodes, Chalfont, PA (US); Yogesh Tiwary, Bangalore (IN)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/014,069

(22) Filed: Feb. 3, 2016

(65) Prior Publication Data

US 2016/0152852 A1  Jun. 2, 2016

Related U.S. Application Data

(62) Division of application No. 14/536,732, filed on Nov. 10, 2014, now Pat. No. 9,284,457.

(60) Provisional application No. 61/904,592, filed on Nov. 15, 2013.

(51) Int. Cl.
| | | |
|---|---|---|
| *C09D 17/00* | (2006.01) | |
| *C09C 1/36* | (2006.01) | |
| *C09D 5/02* | (2006.01) | |
| *C09D 7/12* | (2006.01) | |
| *C09D 141/00* | (2006.01) | |
| *C08F 2/26* | (2006.01) | |
| *C08F 2/44* | (2006.01) | |
| *C09D 1/00* | (2006.01) | |
| *C08K 9/10* | (2006.01) | |
| *C08K 3/22* | (2006.01) | |

(52) U.S. Cl.
CPC ............... *C09D 17/008* (2013.01); *C08F 2/26* (2013.01); *C08F 2/44* (2013.01); *C09C 1/3676* (2013.01); *C09D 1/00* (2013.01); *C09D 5/022* (2013.01); *C09D 5/025* (2013.01); *C09D 5/028* (2013.01); *C09D 7/1225* (2013.01); *C09D 7/1258* (2013.01); *C09D 17/002* (2013.01); *C09D 141/00* (2013.01); *C08K 9/10* (2013.01); *C08K 2003/2241* (2013.01)

(58) Field of Classification Search
CPC .... C09D 5/022; C09D 5/025; C09D 141/00; C09D 17/00; C09D 17/008; C09D 17/002
USPC ............................................................ 524/82
See application file for complete search history.

(56) References Cited

U.S. PATENT DOCUMENTS

| | | | | |
|---|---|---|---|---|
| 4,278,583 | A * | 7/1981 | Sekiya | D21H 19/58 428/511 |
| 5,976,410 | A * | 11/1999 | Rohringer | D21H 21/30 106/287.3 |
| 8,283,404 | B2 | 10/2012 | Allen et al. | |
| 2006/0106131 | A1* | 5/2006 | Edmunds | B41M 5/52 523/160 |
| 2006/0155124 | A1* | 7/2006 | Scheffler | D21H 21/30 544/184 |
| 2012/0214007 | A1* | 8/2012 | Daniels | D21H 19/56 428/452 |

FOREIGN PATENT DOCUMENTS

| | | |
|---|---|---|
| WO | 2012/116025 A1 | 8/2012 |
| WO | 2013016269 A1 | 1/2013 |
| WO | 2013016270 A1 | 1/2013 |
| WO | 2013059765 A1 | 4/2013 |
| WO | 2013142542 A1 | 9/2013 |

OTHER PUBLICATIONS

Technical Data Sheet for Tergitol-15-S.*

* cited by examiner

*Primary Examiner* — James J Seidleck
*Assistant Examiner* — Deve E Valdez
(74) *Attorney, Agent, or Firm* — Reid S. Willis

(57) ABSTRACT

The present invention relates to a pre-paint composite comprising an aqueous slurry of $TiO_2$ particles and a polymeric binder, wherein from 35 to 90 weight percent of the polymeric binder is attached to the $TiO_2$ particles, based on the weight of polymeric binder in the pre-paint composite. The pre-composite of the present invention is useful in paint compositions, particularly those that require freeze-thaw stability.

19 Claims, No Drawings

FREEZE-THAW STABLE PAINT FORMULATION

BACKGROUND OF THE INVENTION

The present invention relates to a paint formulation with improved freeze-thaw stability. Binder composites comprising $TiO_2$ particles encapsulated with polymer, as described for example in U.S. Pat. No. 8,283,404 and WO 2012/116025, have been shown to improve hiding in paint formulations, sometimes dramatically so. Unfortunately, paints formulated with these composites often exhibit poor freeze-thaw stability. It would therefore be an advance in the art of paint formulations to provide a formulation with excellent hiding coupled with freeze-thaw stability.

SUMMARY OF THE INVENTION

The present invention addresses a need by providing, in one aspect, a process for preparing a pre-paint composite comprising the steps of: a) contacting together a mixture of: i) an aqueous dispersion of $TiO_2$ particles and an adsorbing sulfur acid functionalized polymer; ii) an anionic surfactant; iii) sodium styrene sulfonate; and iv) a redox initiator system; to form a first composite intermediate; then b) contacting under emulsion polymerization conditions the first composite intermediate with a first monomer emulsion comprising: i) methyl methacrylate or styrene or a combination thereof; ii) a $C_1$-$C_{10}$ alkyl acrylate; and iii) a carboxylic acid containing monomer under emulsion polymerization conditions; to form a second composite intermediate; then c) contacting the second composite intermediate with a second monomer emulsion comprising: i) styrene or methyl methacrylate or a combination thereof; ii) a $C_1$-$C_{10}$ alkyl acrylate; iii) a carboxylic acid containing monomer; and iv) a secondary alcohol ethoxylate of the formula $C_{10\text{-}15}H_{22\text{-}32}O(CH_2CH_2O)_xH$; to form an aqueous dispersion of $TiO_2$ particles with incomplete attachment of polymeric binder; where x is from 15 to 50 and the $O(CH_2CH_2O)_xH$ group is bonded to a CH group on the $C_{10\text{-}15}H_{22\text{-}32}$ chain.

In a second, the present invention is a pre-paint composite comprising an aqueous slurry of $TiO_2$ particles and attached and unattached polymeric binder, and a sufficient amount of a secondary alcohol ethoxylate of the formula $C_{10\text{-}15}H_{22\text{-}32}O(CH_2CH_2O)_xH$ to give 35 to 90 weight percent attachment of polymeric binder to the $TiO_2$ particles, based on the weight of total polymeric binder in the pre-paint composite, where x is from 15 to 50; and the $O(CH_2CH_2O)_xH$ group is bonded to a CH group on the $C_{10\text{-}15}H_{22\text{-}32}$ chain.

The present invention addresses a need in the art by providing a pre-paint composite that is useful in paint compositions that require freeze-thaw stability.

DETAILED DESCRIPTION OF THE INVENTION

In one aspect, the present invention is a process for preparing a pre-paint composite comprising the steps of: a) contacting together a mixture of: i) an aqueous dispersion of $TiO_2$ particles and an adsorbing sulfur acid functionalized polymer; ii) an anionic surfactant; iii) sodium styrene sulfonate; and iv) a redox initiator system; to form a first composite intermediate; then b) contacting under emulsion polymerization conditions the first composite intermediate with a first monomer emulsion comprising: i) methyl methacrylate or styrene or a combination thereof; ii) a $C_1$-$C_{10}$ alkyl acrylate; and iii) a carboxylic acid containing monomer under emulsion polymerization conditions; to form a second composite intermediate; then c) contacting the second composite intermediate with a second monomer emulsion comprising: i) styrene or methyl methacrylate or a combination thereof; ii) a $C_1$-$C_{10}$ alkyl acrylate; iii) a carboxylic acid containing monomer; and iv) a secondary alcohol ethoxylate of the formula $C_{10\text{-}15}H_{22\text{-}32}O(CH_2CH_2O)_xH$; to form an aqueous dispersion of $TiO_2$ particles with incomplete attachment of polymeric binder; where x is from 15 to 50 and the $O(CH_2CH_2O)_xH$ group is attached to a CH group on the $C_{10\text{-}15}H_{22\text{-}32}$ chain.

As used herein, the term "adsorbing sulfur acid functionalized polymer" refers to a polymeric $TiO_2$-adsorbing dispersant that contains sulfur acid functionality, preferably arising from sulfur-acid functional monomers such as sulfoethyl methacrylate, sulfopropyl methacrylate, styrene sulfonic acid, vinyl sulfonic acid, and 2-acrylamido-2-methyl propanesulfonic acid, and salts thereof, with 2-acrylamido-2-methyl propanesulfonic acid and sulfoethyl methacrylate being preferred.

The sulfur acid functionalized polymer is preferably an adsorbing amphoteric polymer, more preferably a polymer that is prepared from the copolymerization of an ethylenically unsaturated sulfur-acid functional monomer and an ethylenically unsaturated amine functional monomer. Examples of suitable ethylenically unsaturated amine functional monomers include dimethylaminoethyl methacrylate, dimethylaminopropyl methacrylamide, and t-butylaminoethyl methacrylate, with dimethylaminoethyl methacrylate (DMAEMA) being preferred.

In addition to containing amine and sulfur acid functionality, the amphoteric polymer may additionally include functional groups arising from the copolymerization of water-soluble monomers such as hydroxyethyl methacrylate, methacrylamide, acrylamide, or methacrylic acid, or acrylic acid, or combinations thereof.

The dispersion of $TiO_2$ and the preferred adsorbing amphoteric polymer are advantageously prepared by slowly adding, with concomitant grinding, the $TiO_2$ to an aqueous solution of the amphoteric polymer. The preferred solids content of the $TiO_2$/amphoteric polymer dispersion is in the range of 70 to 80 weight percent based on the weight of $TiO_2$, amphoteric polymer, and water.

In a preferred first step, the $TiO_2$/amphoteric polymer dispersion is added to a vessel followed by addition of a) an anionic surfactant such as those well known in the art, preferably as an aqueous solution; and b) preferably an aqueous solution of sodium styrene sulfonate, more preferably as a 5 to 20 weight percent solution based on the weight of water and sodium styrene sulfonate.

The redox initiator system is then advantageously contacted with the mixture to initiate polymerization to form a first composite intermediate. As used herein, the term "redox initiator system" refers to a combination of a reducing agent, an oxidizing agent, and a metal ion catalyst. Examples of suitable oxidizing agents include persulfates such as ammonium and alkali metal persulfates; hydroperoxides, such as t-butyl hydroperoxide and cumene hydroperoxide; peroxides such as benzoyl peroxide, caprylyl peroxide, and di-t-butyl peroxide; peresters such as t-butyl peracetate, t-butyl perphthalate, and t-butyl perbenzoate; percarbonates; and perphosphates; with t-butyl hydroperoxide being preferred.

Examples of suitable reducing agents include ascorbic acid, isoascorbic acid, malic acid, glycolic acid, oxalic acid, lactic acid, and thioglycolic acid; an alkali metal hydrosulfite such as sodium hydrosulfite; a hyposulfite such as potassium hyposulfite; or a metabisulfite such as potassium metabisulfite; and sodium formaldehyde sulfoxylate.

Suitable accelerators include halide and sulfate salts of cobalt, iron, nickel, and copper, used in small amounts. An example of a preferred redox initiator system is t-butyl hydroperoxide/isoascorbic acid/$Fe^{+2}$. Preferably, the accelerator is added prior to the addition of the oxidizing and reducing agents. It is further preferred that the oxidizing and reducing agents are added over time to maintain a relatively even level of radical flux over the course of the addition of monomers.

The first monomer emulsion is preferably added to the first composite intermediate after a waiting period of from 30 seconds to about 10 minutes, more preferably from 1 minute to 5 minutes. It is understood that the term "a first monomer emulsion" is used to refer to an aqueous emulsion of one or more monomers, preferably of more than one monomer. A preferred combination of monomers in the first monomer emulsion comprises methyl methacrylate; a carboxylic acid monomer such as acrylic acid, methacrylic acid, or itaconic acid, preferably in the range of 0.3 to 3 weight percent, based on the weight of total monomers; and a $C_2$-$C_{10}$ acrylate monomer such as butyl acrylate, ethyl acrylate, or ethylhexyl acrylate or a combination thereof.

The first monomer emulsion may also include a crosslinking monomer, which, at low levels, has been found to improve the hiding efficiency of the encapsulated particles. The crosslinking monomer is preferably a multiethylenically unsaturated crosslinking monomer, more preferably a diethylenically unsaturated monomer, used at a level sufficient to form a polymer that is resistant to deformation, preferably in the range of from 0.05 to 3 weight percent based on the weight of the first monomers. Examples of suitable crosslinking monomers include allyl methacrylate, ethylene glycol dimethacrylate, butylene glycol dimethacrylate, and divinyl benzene at a concentration of from 0.1 to 2 weight percent, based on the weight of total first monomers.

The first monomers are polymerized under polymerization conditions, preferably at a starting temperature of from 20° C. to 75° C. to form a first stage polymer having the desired $T_g$.

A second stage polymerization is then carried out by adding a second monomer emulsion to the vessel containing the second composite intermediate. The second monomer emulsion comprises styrene or methyl methacrylate or a combination thereof; ii) a $C_1$-$C_{10}$ alkyl acrylate, preferably ethyl acrylate, butyl acrylate, 2-ethylhexyl acrylate or a combination thereof; iii) a carboxylic acid containing monomer, preferably methacrylic acid, acrylic acid, or itaconic acid, more preferably methacrylic acid; and iv) a secondary alcohol ethoxylate surfactant of the formula $C_{10-15}H_{22-32}O(CH_2CH_2O)_xH$, preferably $C_{12-14}H_{26-30}O(CH_2CH_2O)_xH$, where x is preferably 15 to 50, preferably 20 to 40. Commercially available examples of suitable surfactants include TERGITOL™ 15-S-40 Secondary Alcohol Ethoxylate Surfactant and TERGITOL™ 15-S-20 Secondary Alcohol Ethoxylate Surfactant (A Trademark of The Dow Chemical Company or its Affiliates). The concentration of the secondary alcohol ethoxylate surfactant in the second monomer emulsion is preferably from 0.1 weight percent, more preferably from 0.2 weight percent, and most preferably from 0.3 weight percent, to preferably 3.0 weight percent, more preferably to 2.5 weight percent, more preferably to 1.5 weight percent, and most preferably to 1 weight percent, based on the total weight of the pre-paint composite. The second monomer emulsion preferably further comprises a salt of a sulfur acid monomer, more preferably sodium styrene sulfonate.

A second stage polymerization is then carried out to form an aqueous dispersion of $TiO_2$ particles with incomplete attachment of polymeric binder (the pre-paint composite). The second stage polymer preferably has a $T_g$ of from −40° C. to 40° C., as calculated by the Fox equation.

The weight-to-weight ratio of total monomers to $TiO_2$ solids is preferably from 0.8 to 1.6, more preferably from 1.0 to 1.4.

In a second aspect, the present invention is a pre-paint composite comprising an aqueous slurry of $TiO_2$ particles and attached and unattached polymeric binder, and a sufficient amount of a secondary alcohol ethoxylate of the formula $C_{10-15}H_{22-32}O(CH_2CH_2O)_xH$ to give 35 to 90 weight percent attachment of polymeric binder to the $TiO_2$ particles, based on the weight of total polymeric binder in the pre-paint composite, where x is from 15 to 50; and the $O(CH_2CH_2O)_xH$ group is attached to a CH group on the $C_{10-15}H_{22-32}$ chain. Preferably, the pre-paint composite comprises from 0.2 to 2.5 weight percent of a secondary alcohol ethoxylate represented by the formula $C_{12-14}H_{26-30}O(CH_2CH_2O)_xH$, where x is from 20 to 40. More preferably, the extent of polymeric binder attachment to $TiO_2$ particles ranges from 50, and most preferably from 60 weight percent attached binder, to 90, more preferably to 85 weight percent attached binder.

The pre-paint composite of the present invention can be used to prepare a coatings formulation, which comprises the pre-paint composite and one or more components selected from the group consisting of dispersants, defoamers, surfactants, solvents, additional binders, thickeners, extenders, coalescents, biocides, and colorants. It has been surprisingly discovered that the addition of the secondary alcohol ethoxylate surfactant to the second monomer emulsion results in a marked improvement in the freeze-thaw properties of the final paint formulation. It has further been discovered that addition of the secondary alcohol ethoxylate surfactant in the final paint formulation but not in the second monomer emulsion does not result in a formulation with improved freeze-thaw properties. It appears that incomplete attachment of polymeric binder to $TiO_2$ particles, as manifested by greater than 10 weight percent polymeric binder in the water phase, correlates with good freeze-thaw stability.

In the following examples, $TiO_2$ amphoteric polymer slurry was prepared substantially as described in US2010/0298483, Examples 2 and 5.

Example 1A

Preparation of Pre-Paint Composite with Secondary Alcohol Ethoxylate

Monomer Emulsion 1 (ME1) was prepared by mixing water (45 g), Polystep A-16-22 surfactant (9 g), butyl acrylate (123.3), methacrylic acid (2.16 g), and methyl methacrylate (78.8 g).

Monomer Emulsion 2 (ME2) was prepared by mixing water (225 g), Polystep A-16-22 surfactant (60.3 g), styrene (398.7 g), methacrylic acid (9.9 g), butyl acrylate (612.9 g), sodium styrene sulfonate (5.2 g), and TERGITOL™ 15-S-40 Secondary Alcohol Ethoxylate Surfactant (70% aqueous solution, 36 g).

$TiO_2$ amphoteric polymer slurry (1420.7 g) and water (265.5 g) were added to a 4-neck 5-L round bottom flask equipped with a stirrer, a thermocouple, a nitrogen inlet, and a reflux condenser was added. The mixture was heated to 30° C. under $N_2$, whereupon Polystep A-16-22 surfactant (10.8 g), an aqueous solution of sodium styrene sulfonate (8.6 g in 50 g water), an aqueous solution of t-butyl hydroperoxide (1.71 g in 22 g water), a solution of isoascorbic acid (0.95 g in 22 g water), and a mixture of 0.15% aqueous iron sulfate septa hydrate solution (42.8 g) and 1% aqueous ethylene diamine tetraacetic acid (EDTA, 1.1 g) were sequentially added to the flask. Co-feed catalyst (17.1 g t-butyl hydroperoxide in 212 g water) and co-feed activator (9.5 g isoascorbic acid in 212 g water) were fed to the flask at a rate of 1.6 g/min. Three minutes later, ME1 was fed to the reactor at a rate of 12.9 g/min and the flask temperature rose to 50° C. After ME1 addition was complete, the monomer emulsion vessel was rinsed with deionized water (27 g) into the flask. The co-feed catalyst and activator addition were continued for 3 min and turned off, and the flask was held at 50° C. The co-feed catalyst and activator addition were resumed 18 min later at a rate of 1.6 g/min. ME2 was fed to the reactor 2 min later, at a rate of 13.5 g/min and the reactor temperature was controlled at 68° C. After ME2 addition was complete, the monomer emulsion vessel was rinsed with deionized water (27 g) into the flask, and the co-feed solution additions were continued for 20 min until addition was complete. The flask was cooled to room temperature; when the temperature of the flask reached 45° C., a solution of ACRYSOL™ ASE-60 Anionic Thickener (Trademark of The Dow Chemical Company or Its Affiliates, 19.4 g in 40 g water) was added over 30 min, followed by the addition of a solution of 29% aqueous ammonium hydroxide (14.4 g) and water (36 g). When the contents reached room temperature, they were filtered to remove any gel. The filtered dispersion was found to have a solids content of 57.42% with a pH of 8.6 and 38 ppm of dry gel.

Comparative Example 1A

Preparation of Pre-Paint Composite without a Secondary Alcohol Ethoxylate

The procedure of Example 1A was substantially followed except that ME2 did not contain TERGITOL™ 15-S-40 Secondary Alcohol Ethoxylate Surfactant.

Example 2A

Preparation of Pre-Paint Composite with a Secondary Alcohol Ethoxylate

The procedure of Example 1A was substantially followed except that half as much TERGITOL™ 15-S-40 Secondary Alcohol Ethoxylate Surfactant (70% aqueous solution, 18 g) was used in the ME2 formulation.

Example 3A

Preparation of Pre-Paint Composite with a Secondary Alcohol Ethoxylate

The procedure of Example 1A was substantially followed except that twice as much TERGITOL™ 15-S-40 Secondary Alcohol Ethoxylate Surfactant (70% aqueous solution, 72 g) was used in the ME2 formulation.

Example 4A

Preparation of Pre-Paint Composite with a Secondary Alcohol Ethoxylate

The procedure of Example 1A was substantially followed except that TERGITOL™ 15-S-20 Secondary Alcohol Ethoxylate Surfactant (70% aqueous solution, 36 g) was used in the ME2 formulation.

Paints were prepared from the various pre-paint composites and KU freeze-thaw stability and hiding were measured. For each example the total pigment volume concentration (PVC) was 40 and volume solids was 42% for each paint formulation.

Example 1B

Paint Formulation

The formulation for Example 1B is shown in Table 1. TAMOL, TRITON, PRIMAL, ROPAQUE, CARBITOL, and ACRYSOL are all Trademarks of The Dow Chemical Company or its Affiliates.

TABLE 1

| Paint Formulation Using Example 1A Pre-Paint Composite | |
|---|---|
| Material Name | % Wt. |
| Water | 7.05 |
| Sodium Hexametaphosphate | 0.03 |
| Defoamer | 0.27 |
| TAMOL ™ 945 Dispersant | 0.14 |
| TRITON ™ CF-10 Surfactant | 0.19 |
| Propylene Glycol | 4.00 |
| HEC Thickener | 0.21 |
| Extender | 11.66 |
| 2-Amino-2-methyl-1-propanol (95% active in water) | 0.15 |
| Grind Total | 23.69 |
| Example 1A Pre-Paint Composite | 63.05 |
| PRIMAL ™ CM-219EF Binder | 2.06 |
| ROPAQUE ™ Ultra E Opaque Polymer | 9.62 |
| Butyl CARBITOL ™ Solvent | 1.22 |
| Silicone Resin | 0.06 |
| ACRYSOL ™ RM-2020 Rheology Modifier | 0.30 |
| Paint Total | 100.00 |

Examples 2B-4B

Paint Formulations

Paints were prepared using Example 2A-4A pre-paint composites using substantially the same formulation as shown in Table 1.

Comparative Example 1B

Paint Formulation without Secondary Alcohol Ethoxylate

A Paint was formulated in accordance with Table 1 except that the Pre-Paint Composite contained no secondary alcohol ethoxylate (as per Comparative Example 1A).

Comparative Example 2B

Paint Formulation with Secondary Alcohol Ethoxylate Added Separately

A paint was formulated in accordance with Table 1 except that the Pre-Paint Composite contained no secondary alcohol ethoxylate (as per Comparative Example 1A); TERGITOL™ 15-S-40 Secondary Alcohol Ethoxylate Surfactant (70% aqueous solution, 0.54 g) was added separately to the Paint in this example.

Test Method for Freeze-Thaw Stability

Paint samples (~130 g) were placed in plastic containers and KU viscosities measured; the containers were then capped and taped and placed in a freezer maintained at −10° C. for 16 h. After the samples were removed from the freezer, they were allowed to thaw at ambient temperature for 4 h or more to melt all ice crystals. The paints were then hand-mixed and KU viscosities were measured again (constituting one freeze-thaw cycle). This procedure was repeated two more times to measure viscosity changes in paints after three freeze-thaw cycles.

Test Method for Measuring Polymeric Binder Attached to $TiO_2$

Composite (~20 g) was added to DI water (~12 g) in 50-mL centrifugation vials, which were capped then vigorously hand mixed for about 1 min. The diluted sample was put in a Fischer Scientific Legend X1R centrifuge set at 7000 rpm (acceleration and deceleration at setting 9) and 20° C. for 30 min. Approximately 5 mL of the supernatant was removed and solids content measured in duplicate after removal of liquid at 150° C. for 20 min using weight differences. The weight of the centrifuged solid plug at the bottom was also measured. The quantity of solids in the supernatant was assumed to be polymer unattached to the $TiO_2$. Percent of attached polymeric binder was calculated as:

(Total Polymer−unattached Polymer)/Total Polymer*100.

Kubelka-Munk S/Mil Test Method

Four draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The Y-reflectance was measured using a X-Rite Color i7 Spectrophotometer in each of the scribed areas five times measuring on a diagonal starting at the top of the rectangle and the average Y-reflectance recorded. A thick film draw down was prepared for each paint on the Black Release Charts using a 3" 25 mil block draw down bar and the charts were allowed to dry overnight. The Y-reflectance was measured in five different areas of the draw down and the average Y-reflectance recorded. Kubelka-Munk hiding value S is given by Equation 1:

$$S = \frac{R}{X \times (1-R^2)} \times \ln\frac{1-(R_B \times R)}{1-\frac{R_B}{R}}$$ Equation 1 where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in².

$$X(mils) = \frac{W_{pf}(g) \times 1000(mil/in)}{D(lbs/gal) \times 1.964(g/in^3/lbs/gal) \times A(in)}$$

The Freeze-Thaw and Hiding (S/mil) data for Paint Formulations Examples 1B-4B and Comparative Examples 1B-2B are summarized in Table 2.

In the Table, SAE refers to Secondary Alcohol Ethoxylate; wt. % Active SAE is based on the weight of the pre-paint composite; 15-S-40 and 15-S-20 refer to TERGITOL™ 15-S-40 Secondary Alcohol Ethoxylate Surfactant and TERGITOL™ 15-S-20 Secondary Alcohol Ethoxylate Surfactant, respectively; ME2 refers to the fact that the 15-S-40 or 15-S-20 is added to the second monomer emulsion; PAINT refers to the fact that the SAE is 15-S-40 is added to the Paint; % Attachment refers to the percentage of polymeric binder attached to the $TiO_2$; and F/T refers to freeze/thaw.

TABLE 2

Freeze-Thaw and Hiding Data for Paint Formulations

| Example No. | C. Ex. 1B | C. Ex. 2B | Ex. 1B | Ex. 2B | Ex. 3B | Ex. 4B |
|---|---|---|---|---|---|---|
| wt. % Active SAE | 0 | 1.24 | 0.62 | 0.62 | 0.31 | 0.62 |
| SAE | — | 15-S-40 | 15-S-40 | 15-S-40 | 15-S-40 | 15-S-20 |
| SAE Added to: | — | ME2 | ME2 | PAINT | ME2 | ME2 |
| % Attachment | 95 | 64 | 76 | 95 | 83 | 76 |
| FREEZE-THAW | | | | | | |
| Initial KU | 94 | 98 | 93 | 94 | 89 | 89 |
| KU after 1st F/T cy. | >140 | 100 | 90 | >140 | 90 | 91 |
| KU after 2nd F/T cy. | — | 98 | 90 | — | 90 | 91 |
| KU after 3rd F/T cy. | — | 98 | 90 | — | 83 | 83 |
| RESULT | FAIL | PASS | PASS | FAIL | PASS | PASS |
| HIDING: | | | | | | |
| S/Mil | 7.16 | 6.55 | 7.05 | | 6.77 | 6.56 |
| Std. Dev. | 0.02 | 0.04 | 0.04 | | 0.02 | 0.03 |

The data show acceptable freeze-thaw and hiding profiles when secondary alcohol ethoxylate with 20 to 40 ethoxylate units was included in the second monomer emulsion. ME2 that did not contain this surfactant showed poor freeze-thaw profiles. The data suggest a correlation between acceptable freeze-thaw and hiding properties with incomplete attachment of polymeric binder to the $TiO_2$ particles.

The invention claimed is:

1. A pre-paint composite comprising an aqueous dispersion of $TiO_2$ particles, a polymeric $TiO_2$-adsorbing sulfur acid functionalized dispersant, and a polymeric binder, wherein from 35 to 90 weight percent of the polymeric binder is attached to the $TiO_2$ particles, based on the weight of polymeric binder in the pre-paint composite.

2. The pre-paint composite of claim 1 wherein from 60 to 85 weight percent of the polymeric binder is attached to the $TiO_2$ particles, based on the weight of polymeric binder in the pre-paint composite.

3. The pre-paint composite of claim 1 which further comprises a secondary alcohol ethoxylate of the formula $C_{12-14}H_{26-30}O(CH_2CH_2O)_xH$; wherein x is from 15 to 50 and the $O(CH_2CH_2O)_xH$ group is bonded to a CH group on the $C_{12-14}H_{26-30}$ chain.

4. The pre-paint composite of claim 2 which further comprises a secondary alcohol ethoxylate of the formula $C_{10-15}H_{22-32}O(CH_2CH_2O)_xH$; wherein x is from 15 to 50 and the $O(CH_2CH_2O)_xH$ group is bonded to a CH group on the $C_{10-15}H_{22-32}$ chain.

5. The pre-paint composite of claim 4 wherein x is from 20 to 40.

6. The pre-paint composite of claim 1 wherein the polymer binder is a copolymer of 1) styrene or methyl methacrylate; and 2) a $C_1$-$C_{10}$-alkyl acrylate; and 3) a carboxylic acid containing monomer.

7. The pre-paint composite of claim 1 wherein the polymeric $TiO_2$-adsorbing sulfur acid functionalized dispersant is an adsorbing amphoteric polymer.

8. The pre-paint composite of claim 1 wherein the adsorbing sulfur acid functionalized polymer comprises structural units of 2-acrylamido-2-methyl propanesulfonic acid or sulfoethyl methacrylate or salts thereof or a combination thereof.

9. The pre-paint composite of claim 7 wherein the adsorbing amphoteric polymer comprises structural units of dimethylaminoethyl methacrylate and 2-acrylamido-2-methyl propanesulfonic acid.

10. The pre-paint composite of claim 9 wherein adsorbing amphoteric polymer further comprises structural units of one or more water-soluble polymers selected from the group consisting of hydroxyethyl methacrylate, methacrylamide, acrylamide, methacrylic acid, and acrylic acid.

11. The pre-paint composite of claim 1 wherein the binder is a styrene-butyl acrylate binder.

12. A pre-paint composite comprising an aqueous dispersion of a) $TiO_2$ particles; b) a polymeric $TiO_2$-adsorbing sulfur acid functionalized dispersant; c) a secondary alcohol ethoxylate of the formula $C_{10-15}H_{22-32}O(CH_2CH_2O)_xH$, wherein x is from 15 to 50 and the $O(CH_2CH_2O)_xH$ group is bonded to a CH group on the $C_{10-15}H_{22-32}$ chain; and d) a polymeric binder;
wherein from 35 to 90 weight percent of the polymeric binder is attached to the $TiO_2$ particles, based on the weight of polymeric binder in the pre-paint composite.

13. The pre-paint composite of claim 12 wherein the secondary alcohol ethoxylate is of the formula $C_{12-14}H_{26-30}O(CH_2CH_2O)_xH$; wherein x is from 15 to 50 and the $O(CH_2CH_2O)_xH$ group is bonded to a CH group on the $C_{12-14}H_{26-30}$ chain.

14. The pre-paint composite of claim 12 wherein the polymer binder is a copolymer of 1) styrene or methyl methacrylate; and 2) a $C_1$-$C_{10}$-alkyl acrylate; and 3) a carboxylic acid containing monomer.

15. The pre-paint composite of claim 12 wherein x is from 20 to 40.

16. The pre-paint composite of claim 12 wherein the sulfur acid functionalized polymer is an adsorbing amphoteric polymer.

17. The pre-paint composite of claim 16 wherein the adsorbing sulfur acid functionalized polymer comprises structural units of 2-acrylamido-2-methyl propanesulfonic acid or sulfoethyl methacrylate or salts thereof or a combination thereof.

18. The pre-paint composite of claim 17 wherein the adsorbing amphoteric polymer comprises structural units of dimethylaminoethyl methacrylate and 2-acrylamido-2-methyl propanesulfonic acid.

19. The pre-paint composite of claim 15 wherein the binder is a styrene-butyl acrylate binder.

* * * * *